(12) United States Patent
Sudo

(10) Patent No.: US 8,810,586 B2
(45) Date of Patent: Aug. 19, 2014

(54) DISPLAY CONTROLLER AND METHOD FOR SWITCHING DISPLAY BETWEEN TWO GPU DRIVEN DATA PATHS DEPENDING ON EXTERNAL DISPLAY CAPABILITY

(75) Inventor: Fukukyo Sudo, Nagano (JP)

(73) Assignee: Sony Corporation (JP)

( * ) Notice: Subject to any disclaimer, the term of this patent is extended or adjusted under 35 U.S.C. 154(b) by 84 days.

(21) Appl. No.: 13/235,565

(22) Filed: Sep. 19, 2011

(65) Prior Publication Data

US 2012/0081374 A1    Apr. 5, 2012

(30) Foreign Application Priority Data

Sep. 30, 2010 (JP) ................ P2010-221509

(51) Int. Cl.
*G06F 13/14* (2006.01)
*G06F 15/16* (2006.01)

(52) U.S. Cl.
USPC ........................................ 345/520; 345/502

(58) Field of Classification Search
None
See application file for complete search history.

(56) References Cited

U.S. PATENT DOCUMENTS

| | | | |
|---|---|---|---|
| 7,616,206 B1 | 11/2009 | Danilak | |
| 2006/0267993 A1* | 11/2006 | Hunkins et al. | ............... 345/502 |
| 2007/0171230 A1 | 7/2007 | Iwase et al. | |
| 2007/0283175 A1 | 12/2007 | Marinkovic et al. | |
| 2009/0079746 A1* | 3/2009 | Howard et al. | ............... 345/502 |
| 2009/0295810 A1 | 12/2009 | Endo | |
| 2011/0109792 A1* | 5/2011 | Montag | ...................... 348/390.1 |

FOREIGN PATENT DOCUMENTS

JP    2007-179225 A    7/2007

OTHER PUBLICATIONS

European Search Report EP 11176672, dated Mar. 21, 2012.

* cited by examiner

*Primary Examiner* — Carlos Perromat
*Assistant Examiner* — Nurun N Flora
(74) *Attorney, Agent, or Firm* — Lerner, David, Littenberg, Krumholz & Mentlik, LLP

(57) ABSTRACT

A display controller which may include a first display control section, a second display control section, a signal line, an output selection section, and a mode selection control section. The first display control section includes a first image generation portion adapted to decode content and first image output portion adapted to output the decoded content. The second display control section includes a second image generation portion and second image output portion. The signal line conveys the decoded content to the second image output portion. The output selection section selects one of the outputs of the first and second image output portions. The mode selection control section selects one of first and second display modes, based on functional information about the first and second display control sections.

5 Claims, 7 Drawing Sheets

FIG. 2

| SPECIFICATION | SUPPORTED FUNCTION | | VALUE |
|---|---|---|---|
| VIDEO | Source_HDMI_YCbCr | | N |
| | Source_AVI_Required | | Y |
| | Source_AVI_Supported | | Y |
| | Source_AVI_info_Available | | Y |
| | Source_xvYCC | | Y |
| | Source_60Hz | | Y |
| | Source_50Hz | | Y |
| | ⋮ | | ⋮ |
| AUDIO | Source_Basic_Audio | | Y |
| | Source_PCM_Channels | | 8ch |
| | Source_Max_Fs_2ch | | 48kHz |
| | Source_Max_Fs_Multi-ch | | 48kHz |
| | Source_NonPCM_Types | Additional audio Coding Types supported | |
| | | 2: AC-3 (Dolby Digital) | Y |
| | | ⋮ | ⋮ |
| | | 6: AAC | N |
| | | 7: DTS | Y |
| | | ⋮ | ⋮ |
| | Source_NonPCM_Max_Fs | | 48kHz |
| | ⋮ | | ⋮ |

EXAMPLE OF FUNCTION LIST OF AN INTEGRATED GPU

FIG.3

| SPECIFICATION | SUPPORTED FUNCTION | | VALUE |
|---|---|---|---|
| VIDEO | Source_HDMI_YCbCr | | Y |
| | Source_AVI_Required | | Y |
| | Source_AVI_Supported | | Y |
| | Source_AVI_info_Available | | Y |
| | Source_xvYCC | | Y |
| | Source_60Hz | | Y |
| | Source_50Hz | | Y |
| | ⋮ | | ⋮ |
| AUDIO | Source_Basic_Audio | | Y |
| | Source_PCM_Channels | | 8ch |
| | Source_Max_Fs_2ch | | 192kHz |
| | Source_Max_Fs_Multi-ch | | 192kHz |
| | Source_NonPCM_Types | Additional audio Coding Types supported | |
| | | 2: AC-3 (Dolby Digital) | Y |
| | | ⋮ | ⋮ |
| | | 6: AAC | Y |
| | | 7: DTS | Y |
| | | ⋮ | ⋮ |
| | Source_NonPCM_Max_Fs | | 48kHz |
| | ⋮ | | ⋮ |

EXAMPLE OF FUNCTION LIST OF A DISCRETE GPU

DISPLAY CONTROLLER AND METHOD FOR SWITCHING DISPLAY BETWEEN TWO GPU DRIVEN DATA PATHS DEPENDING ON EXTERNAL DISPLAY CAPABILITY

CROSS-REFERENCE TO RELATED APPLICATION

The present application claims priority from Japanese Patent Application No. JP 2010-221509 filed in the Japanese Patent Office on Sep. 30, 2010, the entire content of which is incorporated herein by reference.

BACKGROUND

The present disclosure relates to a display controller, information processing device and display method, and more particularly, to a display controller capable of switching between GPUs (Graphics Processing Units), for example, according to the application, and to an information processing device having the same and display method of the same.

Information processing device products such as personal computers incorporating a GPU (hereinafter referred to as an integrated GPU) in their CPU (Central Processing Unit) or chipset have been developed. Further, some products equipped with another GPU connected to an external device (hereinafter referred to as a discrete GPU) are now available. Such a discrete GPU is designed, for example, for a high-resolution external monitor.

The comparison of integrated and discrete GPUs shows that the discrete GPUs generally offer higher processing capability, but that the integrated GPUs consume less power. Therefore, various techniques for switching between the two GPUs have been proposed in consideration of the above features for those information processing devices having integrated and discrete GPUs (refer, for example, to Japanese Patent Laid-Open No. 2007-179225 referred to as Patent Document 1 hereinafter).

Patent Document 1 proposes a technique for switching between the integrated and discrete GPUs by user operation.

SUMMARY

The simplest of all approaches to switching the display output between the integrated and discrete GPUs in an information processing device having the two GPUs is to select one of the two display outputs using a switching circuit, i.e., a multiplexer. In the description given below, the switching system using a multiplexer will be referred to as the MUXed system.

FIG. 6 illustrates a schematic configuration of a display controller based on the MUXed system. In a display controller 200 based on the MUXed system, the output terminals of an integrated GPU 201 (iGPU) and a discrete GPU 202 (dGPU) are connected to the input terminals of a multiplexer 10.

In the MUXed system, the content supplied to the integrated GPU 201 is supplied to the multiplexer 10 via an image generation portion 11, frame buffer 12 and image output portion 13 of the integrated GPU 201. On the other hand, the content supplied to the discrete GPU 202 is supplied to the multiplexer 10 via an image generation portion 21, frame buffer 22 and image output portion 23 of the discrete GPU 202. Then, one of the outputs of the integrated GPU 201 and discrete GPU 202 is selected by and output from the multiplexer 10. In order to display content of a Blu-ray (registered trademark) disk on an HDMI (High-Definition Multimedia Interface) TV, for example, the content is output to the display via the discrete GPU 202.

It should be noted, however, that if the MUXed system is used, it is necessary to provide the multiplexer 10 for each group of display outputs to be switched. Further, this display system leads to problems including blackening of the display screen (interruption of the display image) when the display output is switched.

For an information processing device having integrated and discrete GPUs, on the other hand, there has been a display system that uses one of the display outputs of the integrated and discrete GPUs at all times. In the description given below, this display system will be referred to as the MUXless system.

With the MUXless system, there is no need to provide a multiplexer, thus contributing to reduced power consumption. In the case of a laptop personal computer in which great importance is attached to reducing the power consumption and increasing the battery operation time, for example, the supplied content is output via the integrated GPU. In this case, the integrated GPU that consumes less power than the discrete GPU is used, thus contributing to further reduced power consumption.

FIG. 7 illustrates a schematic configuration of a display controller based on the MUXless system adapted to output content by using the integrated GPU. It should be noted that, in a display controller 300 based on the MUXless system shown in FIG. 7, the same components as those of the display controller 200 based on the MUXed system shown in FIG. 6 are denoted by the same reference numerals.

In the controller 300 based on the MUXless system, the content supplied to an integrated GPU 301 is output to the display via the image generation portion 11, frame buffer 12 and image output portion 13 of the integrated GPU 301.

On the other hand, the content supplied to a discrete GPU 302 is first decoded by the image generation portion 21 of the discrete GPU 302. Then, the decoded content is transmitted to the frame buffer 12 of the integrated GPU 301 via a bus signal line 20 called PCIe (Peripheral Component Interconnect Express) bus (hereinafter referred to as the PCIe bus). Then, the content supplied to the frame buffer 12 is output to the display via the image output portion 13. Among types of content that are output from the discrete GPU 302 via the integrated GPU 301 are games and the like.

The MUXless system not only contributes to reduced power consumption as described earlier but also is free from problems including blackening of the display screen when the display output is switched because no multiplexer is used. That is, the MUXless system eliminates the above problems associated with the MUXed system. However, the MUXless system has the following problems.

In general, the integrated and discrete GPUs are often not comparable in terms of functionality and/or performance. For example, if the discrete GPU 302 offers higher performance than the integrated GPU 301 in the MUXless system in which content is output to the display from the integrated GPU 301, it is difficult to display the content image in such a manner as to achieve the maximum performance from the discrete GPU 302. In this case, therefore, there are cases where one wishes to output the content directly from the discrete GPU 302 depending on the application.

The present disclosure has been made in light of the foregoing, and it is desirable to provide a display controller capable of displaying an image in such a manner as to achieve the maximum performance from both of the integrated and discrete GPUs, reducing power consumption in displaying, and to an information processing device having the same and display method of the same.

According to an embodiment of the present disclosure, there is provided a display controller. The display controller includes first and second display control sections, a signal line, output selection section and mode selection control section. Each section has the following configuration and functions. That is, the first display control section includes a first image generation portion adapted to decode content and first image output portion adapted to output the decoded content. The second display control section includes a second image generation portion adapted to decode content and second image output portion adapted to output the decoded content. The signal line conveys the content decoded by the first image generation portion to the second image output portion. The output selection section selects one of the outputs of the first and second image output portions. The mode selection control section incorporates the first display control section and selects one of two modes, first and second display modes, based on functional information about the first and second display control sections. It should be noted that the first display mode is designed to output the content supplied to the second display control section via the second image generation portion and second image output portion. Also, the second display mode is designed to output the content supplied to the second display control section via the second image generation portion, signal line and first image output portion.

It should be noted that the term "content" in the present specification refers to video (image) information, audio information, text information and information including combinations thereof. Also, video information includes still and moving images.

According to an embodiment of the present disclosure, there is provided an information processing device including: a first display control section, a second display control section, a signal line, an output selection section, a mode selection control section, and a display section. The first display control section includes a first image generation portion adapted to decode content and first image output portion adapted to output the decoded content. The second display control section includes a second image generation portion adapted to decode content and second image output portion adapted to output the decoded content. The signal line is adapted to convey the content decoded by the first image generation portion to the second image output portion. The output selection section is adapted to select one of the outputs of the first and second image output portions. The mode selection control section incorporates the first display control section and is adapted to select one of two modes, first and second display modes, based on functional information about the first and second display control sections, the first display mode being designed to output the content supplied to the second display control section via the second image generation portion and second image output portion, the second display mode being designed to output the content supplied to the second display control section via the second image generation portion, signal line and first image output portion. The display section is adapted to display the content output from the output selection section.

According to an embodiment of the present disclosure, there is provided a display method of a display controller, the display controller including:
a first display control section having a first image generation portion adapted to decode content and first image output portion adapted to output the decoded content;
a second display control section having a second image generation portion adapted to decode content and second image output portion adapted to output the decoded content;
a signal line adapted to convey the content decoded by the first image generation portion to the second image output portion;
an output selection section adapted to select one of the outputs of the first and second image output portions; and
a mode selection control section incorporating the first display control section and adapted to select one of two modes, first and second display modes, based on functional information about the first and second display control sections, the first display mode being designed to output the content supplied to the second display control section via the second image generation portion and second image output portion, the second display mode being designed to output the content supplied to the second display control section via the second image generation portion, signal line and first image output portion. The mode selection control section includes acquiring functional information about the first and second display control sections, and selecting one of two modes, first and second display modes, based on functional information about the first and second display control sections, the first display mode being designed to output the content supplied to the second display control section via the second image generation portion and second image output portion, the second display mode being designed to output the content supplied to the second display control section via the second image generation portion, signal line and first image output portion.

In the present disclosure, the content display mode is switched between the first display mode (display mode of the MUXed system) and second display mode (display mode of the MUXless system) based on the functional information about the first and second display control sections. Therefore, the present disclosure provides image display in such a manner as to achieve the maximum performance from both of the integrated and discrete GPUs while at the same time contributing to reduced power consumption during content display.

BRIEF DESCRIPTION OF THE DRAWINGS

FIG. 2 is a diagram illustrating an example of a function list of an integrated GPU;

FIG. 3 is a diagram illustrating an example of a function list of a discrete GPU;

DETAILED DESCRIPTION OF THE PREFERRED EMBODIMENT

A description will be given below of the display controller according to an embodiment of the present disclosure, information processing device having the same display controller and an example of a content display method of the same display controller with reference to the accompanying drawings in the following order. It should be noted that the present disclosure is not limited to the example described below.

1. Configuration Example of the Information Processing Device and Display Controller
2. Example of Displaying Content <1. Configuration Example of the Information Processing Device and Display Controller>

[Configuration of the Information Processing Device]

Figure 1:
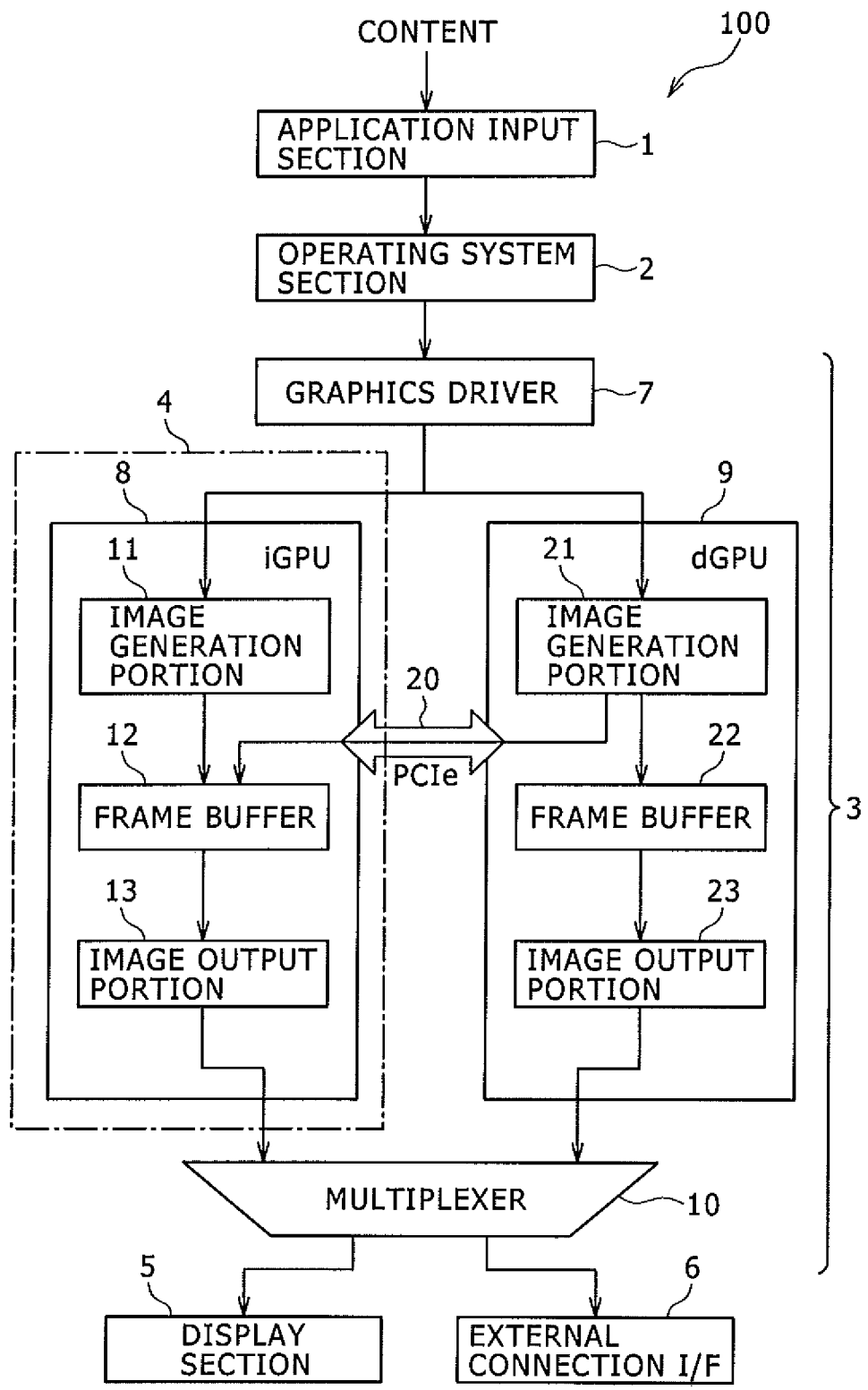
FIG. 1 is a schematic block configuration diagram of an information processing device according to an embodiment of the present disclosure.

A description will be given first of the configuration of the information processing device having the display controller (display control section) according to an embodiment of the present disclosure. FIG. 1 illustrates a schematic block configuration of the information processing device according to the present embodiment. It should be noted that only those major sections are shown that are related to displaying content.

An information processing device 100 according to the present disclosure includes an application input section 1, operating system section 2, display control section 3 (display controller), CPU 4 (mode selection control section), display section 5 and external connection interface 6. It should be noted that the configuration of the display control section 3 will be described in detail later.

The application input section 1 acquires predetermined content from external equipment. It should be noted that if content is supplied, for example, from recording media such as optical disk, a driver is provided in the application input section 1 to drive the recording media. On the other hand, if content is delivered from an external source such as digital terrestrial television broadcasting via a communication network, a communication interface is provided in the application input section 1. The communication interface is made up, for example, of a communication device capable of communicating with the external communication network. It should be noted that the application input section 1 may have both a driver adapted to drive recording media and a communication interface.

The application input section 1 outputs the acquired content to a graphics driver 7 (described later) of the display control section 3 via the operating system section 2 of the information processing device 100. It should be noted that the operating system section 2 performs various processes adapted to ensure compatibility in content data between the application input section 1 and graphics driver 7.

The CPU 4 is a controller and arithmetic processor adapted to control the operation of the information processing device 100 as a whole. Further, in the present embodiment, the CPU 4 incorporates an integrated GPU 8 which will be described later. Still further, the CPU 4 controls the switching of the content display mode between the mode based on the MUXed system (hereinafter referred to as the MUXed mode) and that based on the MUXless system (hereinafter referred to as the MUXless mode).

The display section 5 includes, for example, a display such as LCD (Liquid Crystal Display) to display content output from the display control section 3.

The external connection interface 6 includes, for example, a connection terminal of an external display. For example, if the information processing device 100 is connectable to an HDMI TV, an HDMI terminal is provided as the external connection interface 6.

[Configuration of the Display Control Section]

The display control section 3 includes the graphics driver 7 (input selection section), integrated GPU 8 (first display control section), a discrete GPU 9 (second display control section) and the multiplexer 10 (output selection section). Further, in the present embodiment, the display control section 3 includes a PCIe bus 20 (signal line) adapted to connect the integrated and discrete GPUs 8 and 9.

It should be noted that only the single multiplexer 10 is shown in the example shown in FIG. 1 to simplify the description. Practically, however, the two multiplexers 10 are arranged parallel to each other. One of the multiplexers 10 is used to output the content to the display section 5. The other multiplexer 10 is used to output the content to the external connection interface 6 (external display).

The graphics driver 7 selects the GPU capable of handling the supplied content, outputting the content to the selected GPU. This selection of one of the GPUs by the graphics driver 7 is performed according to the device (e.g., DVD driver or communication device) used in the application input section 1. It should be noted that the present disclosure is not limited to this example. Instead, the graphics driver 7 may select the GPU based on management information about the input content including the format, date of creation and copyright protection specification.

The integrated GPU 8 is incorporated in the CPU 4 of the information processing device 100 and driven by the same power source as for the CPU 4. This ensures low power consumption of the integrated GPU 8. Further, the integrated GPU 8 includes the image generation portion 11 (first image generation portion), frame buffer 12 and image output portion (first image output portion). Then, the image generation portion 11, frame buffer 12 and image output portion 13 are electrically connected in this order from the content input side.

The image generation portion 11 subjects the supplied content data to predetermined image processing, thus generating image data. That is, the image generation portion 11 decodes the supplied content.

The frame buffer 12 temporarily stores the image data generated by the image generation portion 11 on a frame-by-frame basis. Then, the frame buffer 12 successively outputs the temporarily stored frame-by-frame image data to the image output portion 13.

The image output portion 13 performs various image adjustments on the frame-by-frame image data to tailor the data to the display. Then, the image output portion 13 outputs the adjusted image data to the associated display (display section 5 or external display) via the multiplexer 10.

The discrete GPU 9 is designed to display content, for example, on an external display device such as high-resolution external monitor. Therefore, the discrete GPU 9 offers higher processing capability but consumes more power than the integrated GPU 8.

On the other hand, the discrete GPU 9 includes the image generation portion 21 (second image generation portion), frame buffer 22 and image output portion 23 (second image output portion). Then, the image generation portion 21, frame buffer 22 and image output portion 23 are electrically connected in this order from the content input side. It should be noted that the image generation portion 21, frame buffer 22 and image output portion 23 are identical in processing capability of supplied content to the image generation portion 11, frame buffer 12 and image output portion 13 of the integrated GPU 8, respectively.

The multiplexer 10 is connected to the output terminals of the integrated and discrete GPUs 8 and 9, switching between the outputs of the two GPUs and outputting the selected output to the display. This allows for the display control section 3 according to the present embodiment to display the content according to the MUXed system (in the MUXed mode).

It should be noted that although a case has been described in the present embodiment in which the multiplexer is used as means of choosing (or switching) between the outputs of the integrated and discrete GPUs 8 and 9, the present disclosure is not limited thereto. Instead, any selection means can be used.

The PCIe bus 20 connects the frame buffer 12 of the integrated GPU 8 and the image generation portion 21 of the discrete GPU 9. This allows for the display control section 3 according to the present embodiment to display the content according to the MUXless system (in the MUXless mode).

It should be noted that, in the MUXless mode, the content supplied to the discrete GPU 9 is output via the image generation portion 21 of the discrete GPU 9 and the frame buffer 12 and image output portion 13 of the integrated GPU 8. In the MUXless mode, on the other hand, the CPU 4 controls the multiplexer 10 to select the output of the integrated GPU 8 at all times.

As described above, the display control section 3 according to the present embodiment can display content in both the MUXed mode (first display mode) and MUXless mode (second display mode). That is, the display control section 3 according to the present embodiment can switch the content display mode between the MUXed and MUXless modes as necessary and as appropriate.

Therefore, the present embodiment not only contributes to reduced power consumption to the extent possible but also provides image display in such a manner as to achieve the maximum performance from both of the integrated and discrete GPUs 8 and 9. It should be noted that the display mode is switched in the present embodiment based on the functions supported by each of the two GPUs and that this switching is controlled by the CPU 4 in which the integrated GPU 8 is incorporated.

[Example of Function List of Each of the GPUs]

In the present embodiment, the functions supported by each of the GPUs are, for example, compared against those supported by the external display as described later. The display mode is switched based on the comparison results. In order to compare the functions, each of the integrated and discrete GPUs 8 and 9 has a list of supported functions. It should be noted that each function list is stored, for example, in the storage section of the associated GPU (not shown) or in the storage section of the CPU 4 (not shown).

FIGS. 2 and 3 illustrate examples of function lists of the integrated and discrete GPUs 8 and 9. In the function lists shown in FIGS. 2 and 3, the supported functions are grouped by specification (video and audio).

The term "Value" in the right column of each function list refers to a parameter indicating the presence or absence of the associated function. For example, "Y" and "N" indicate respectively that the associated function is available and not available. Further, "8ch" for the associated function Source_PCM_Channels, for example, is the maximum number of channels of L-PCM (Linear Pulse Code Modulation) supported by the GPU. Still further, "48 kHz" for the associated function $Source_{13}$ Max_Fs_2ch, for example, is the maximum frequency of L-PCM for two-channel audio. It should be noted that "48 kHz" for the associated function Source_NonPCM_Max_Fs is the maximum value of ACR (Allowed Cell Rate) for a non-PCM format.

As is clear from the function lists shown in FIGS. 2 and 3, the integrated GPU 8 does not support the function Source_HDMI_YCbCr of the video specification in the present embodiment. However, the discrete GPU 9 supports this function. In the audio specification, on the other hand, the integrated GPU 8 offers a maximum frequency of 48 kHz for the functions Source_Max_Fs_2ch and Source_Max_Fs_Multi-ch. In contrast, however, the discrete GPU 9 offers a maximum frequency of 192 kHz for the same functions.

Further, in the audio specification, the integrated GPU 8 does not support AAC (Advanced Audio Coding). However, the discrete GPU 9 supports AAC. The two GPUs are identical in all other functions.

It is also clear from the difference between the function lists of the integrated and discrete GPUs 8 and 9 that the discrete GPU 9 offers higher functionality and performance than the integrated GPU 8.

<2. Example of Displaying Content>

A description will be given next of the displaying of content handled by the display control section 3 (display controller). As described above, the display control section 3 according to the present embodiment can display content in both the MUXed and MUXless modes. In the present embodiment, the content display mode is switched between the MUXed and MUXless modes based on a variety of information about the GPUs, display and content.

More specifically, two approaches are used to switch the content display mode in the present embodiment, (1) first approach adapted to switch the mode based on information about the external display connected to the information processing device 100 and (2) second approach adapted to switch the mode based on information about supplied content. The present embodiment uses the two approaches to display content. A detailed description will be given below of an example of each approach with reference to the accompanying drawings.

(1) Displaying Content Based on Information about the External Display

This approach is designed to switch the display mode according to the group of functions supported by the connected external display (function list). It should be noted that the group of functions supported by the external display includes a list of screen modes that can be displayed with various interfaces such as analog RGB, DVI (Digital Visual Interface), HDMI and DisplayPort. Still further, the group of functions supported by the external display also includes information about audio formats supported in various interfaces such as HDMI and DisplayPort.

Figure 4:
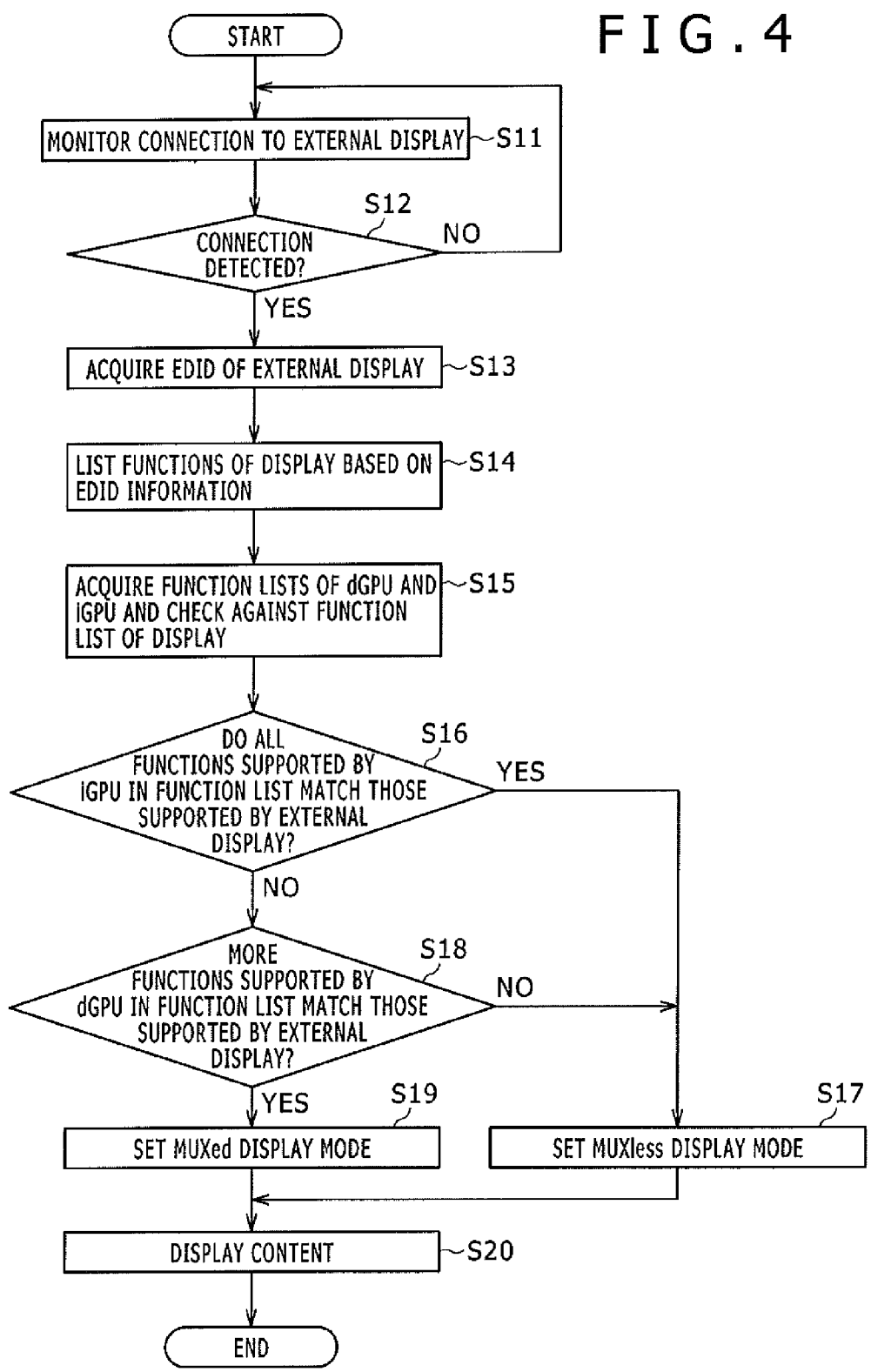
FIG. 4 is a flowchart of an approach to displaying content according to the embodiment of the present disclosure.

A description will be given here of the approach to displaying content based on information about the external display with reference to FIG. 4. It should be noted that FIG. 4 is a flowchart of the approach to displaying content based on information about the external display connected to the information processing device 100.

First, the display control section 3 (more specifically, the CPU 4 incorporating the integrated GPU 8) monitors the connection of an external display (step S11). Next, the CPU 4 determines whether any external display has been connected (step S12).

If no connection of an external display is detected in step S12, the result in this step is NO. In this case, the CPU 4 returns to step S11 to continue monitoring the connection of an external display.

On the other hand, when the connection of an external display is detected in step S12, the result in this step is YES. In this case, the CPU 4 acquires information specific to the external display. For example, if the connected external display is an HDMI TV, the CPU 4 acquires its EDID (Extended Display Identification Data) (step S13). It should be noted that EDID includes information such as the model, settings and supported functions of the display.

Next, the CPU 4 lists the functions of the external display included in the acquired specific content information (e.g., EDID) (step S14).

Next, the CPU 4 acquires the function lists of the integrated and discrete GPUs 8 and 9 and compares them against the function list of the external display (step S15).

Next, the CPU 4 determines whether the functions in the list of the integrated GPU 8 match those in the function list of the connected external display (step S16).

When all the functions in the list of the integrated GPU 8 match those in the function list of the connected external display in step S16, the result in this step is YES. In this case, the integrated GPU 8 is capable, in terms of performance and functionality, of achieving full performance from the external display. Therefore, when the result in step S16 is YES, the CPU 4 sets the content display mode to the MUXless mode (step S17). Then, the CPU 4 displays the content on the external display according to the MUXless mode (step S20).

On the other hand, if all the functions in the list of the integrated GPU 8 do not match those in the function list of the connected external display in step S16, the result in this step is NO. In this case, the integrated GPU 8 is not capable, in terms of performance and functionality, of achieving full performance from the external display. Therefore, if the result in step S16 is NO, the CPU 4 determines whether the discrete GPU 9 is more suitable than the integrated GPU 8 for use with the external display. More specifically, the CPU 4 determines whether the number of functions supported by the discrete GPU 9 matching those supported by the external display is greater than the number of functions supported by the integrated GPU 8 matching those supported by the external display (step S18).

If the number of functions supported by the discrete GPU 9 matching those supported by the external display is smaller than the number of functions supported by the integrated GPU 8 matching those supported by the external display in step S18, the result in this step is NO. In this case, the integrated GPU 8 is more compatible with the external display than the discrete GPU 9. Therefore, if the result in step S18 is NO, the CPU 4 sets the content display mode to the MUXless mode (step S17). Then, the CPU 4 displays the content on the external display according to the MUXless mode (step S20).

On the other hand, when the number of functions supported by the discrete GPU 9 matching those supported by the external display is greater than the number of functions supported by the integrated GPU 8 matching those supported by the external display in step S18, the result in this step is YES. In this case, the discrete GPU 9 is more compatible with the external display than the integrated GPU 8. Therefore, when the result in step S18 is YES, the CPU 4 sets the content display mode to the MUXed mode (step S19). Then, the CPU 4 displays the content on the external display according to the MUXed mode (step S20).

In the present embodiment, content is displayed by switching the content display mode based on information about the external display as described above.

As described above, content is displayed in the MUXed mode only when the number of functions supported by the discrete GPU 9 matching those supported by the external display is greater than the number of functions supported by the integrated GPU 8 matching those supported by the external display. That is, content is displayed in the MUXed mode to achieve the maximum performance from the external display if it is difficult for the integrated GPU 8 to achieve full functionality and performance from the external display. In all other cases, the integrated GPU 8 is sufficiently capable of handling the task in terms of functionality. Therefore, content is displayed in the MUXless mode.

Thus, switching the display mode according to the compatibility between each GPU and the external display in terms of functionality provides image display in such a manner as to achieve the maximum performance from both of the integrated and discrete GPUs 8 and 9 while at the same time contributing to reduced power consumption.

(2) Displaying Content Based on Information About Supplied Content

A description will be given next of the approach designed to display content by switching the content display mode based on information about supplied content. However, a description will be given first of the reason why the content display mode is switched based on information about the supplied content.

There is the following problem if the supplied content is copyrighted content such as that supplied from a DVD (Digital Versatile Disc), Blu-ray (registered trademark) or digital terrestrial television broadcasting (hereinafter referred to as copyrighted content).

If the display control section 3 includes the integrated and discrete GPUs 8 and 9 and can display content according to the MUXless system as in the present embodiment, the integrated and discrete GPUs 8 and 9 are connected by the PCIe bus 20. In the MUXless mode, the content supplied to the discrete GPU 9 is transmitted to the integrated GPU 8 via the PCIe bus 20 and finally output from the integrated GPU 8.

If the content supplied to the discrete GPU 9 of the display control section 3 configured as described above is copyrighted content, it is necessary to protect the data of the content from theft in the process from subjecting the compressed data to the predetermined process to displaying the resultant data on the display. However, the PCIe bus 20 does not have any data protection capability. Theoretically (physically), therefore, it is possible to read the content data from the PCIe bus 20. Therefore, if, after the decoding of copyrighted content by the discrete GPU 9 in the MUXless mode, the decoded data is transmitted to the integrated GPU 8 via the PCIe bus 20 without being encrypted, there is a likelihood that the data may be stolen on the PCIe bus 20.

In order to prevent the above problem, therefore, the present embodiment displays the supplied content in the MUXed mode if the content is copyrighted, thus preventing the transmission of the content over the PCIe bus 20. This allows for copyrighted content to be displayed with no risk of data theft.

Figure 5:
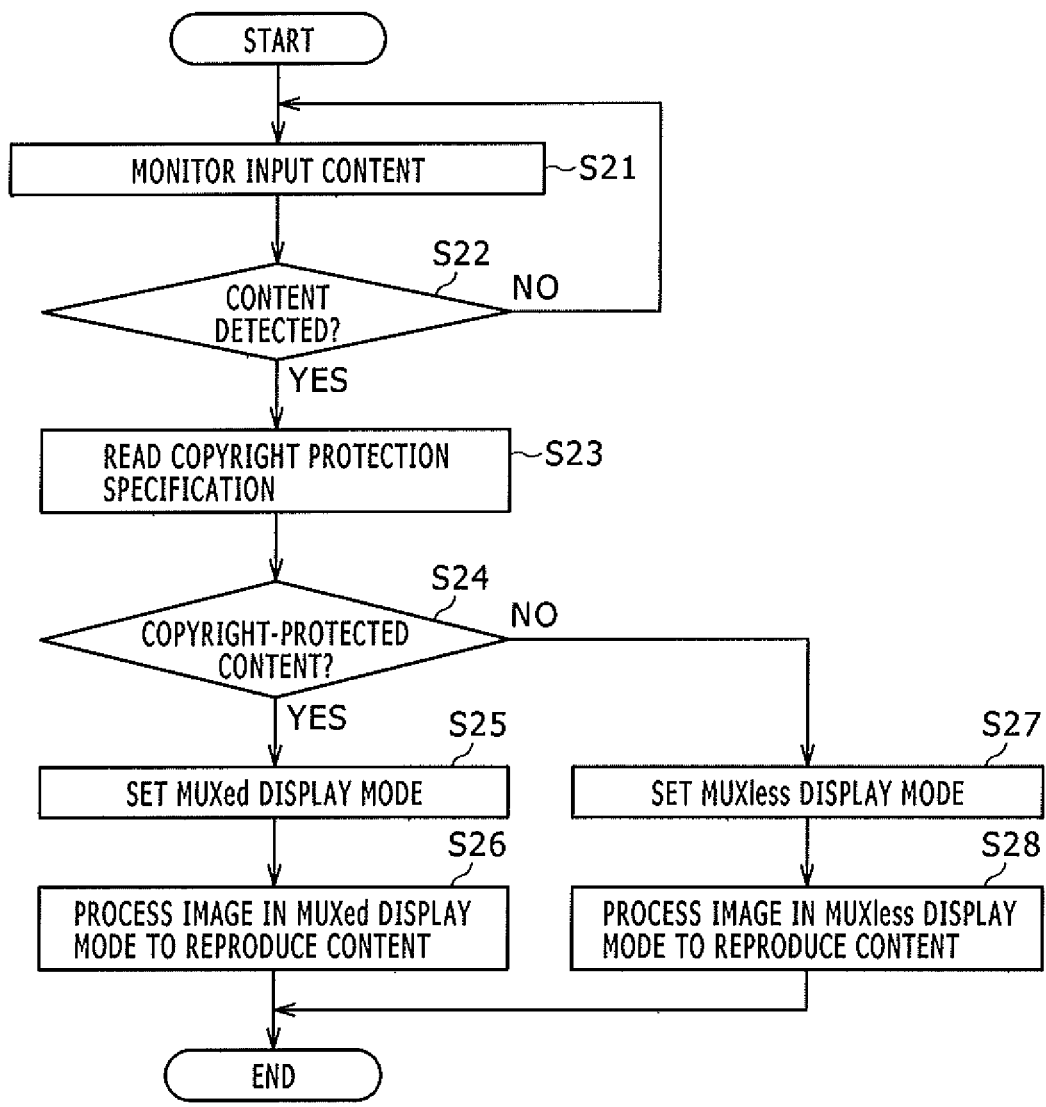
FIG. 5 is a flowchart of the approach to displaying content according to the embodiment of the present disclosure.
Figure 6:
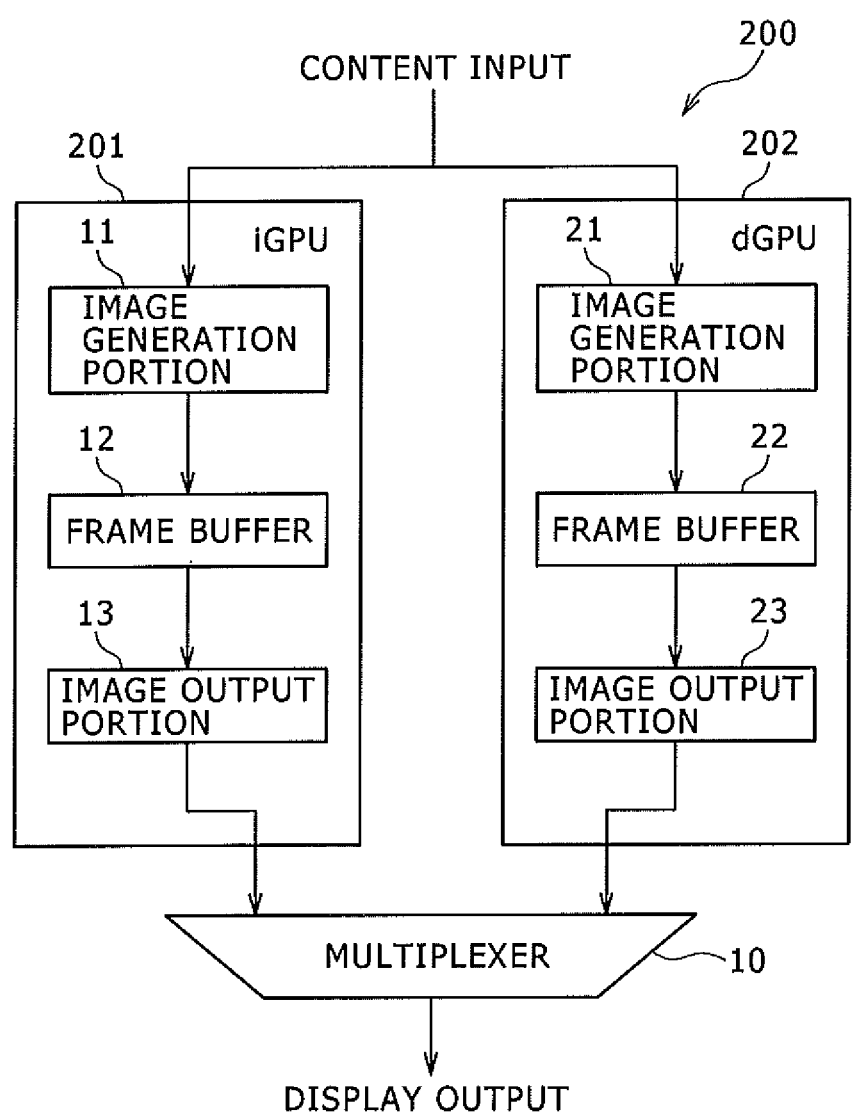
FIG. 6 is a schematic block configuration diagram of a display controller based on the MUXed system.
Figure 7:
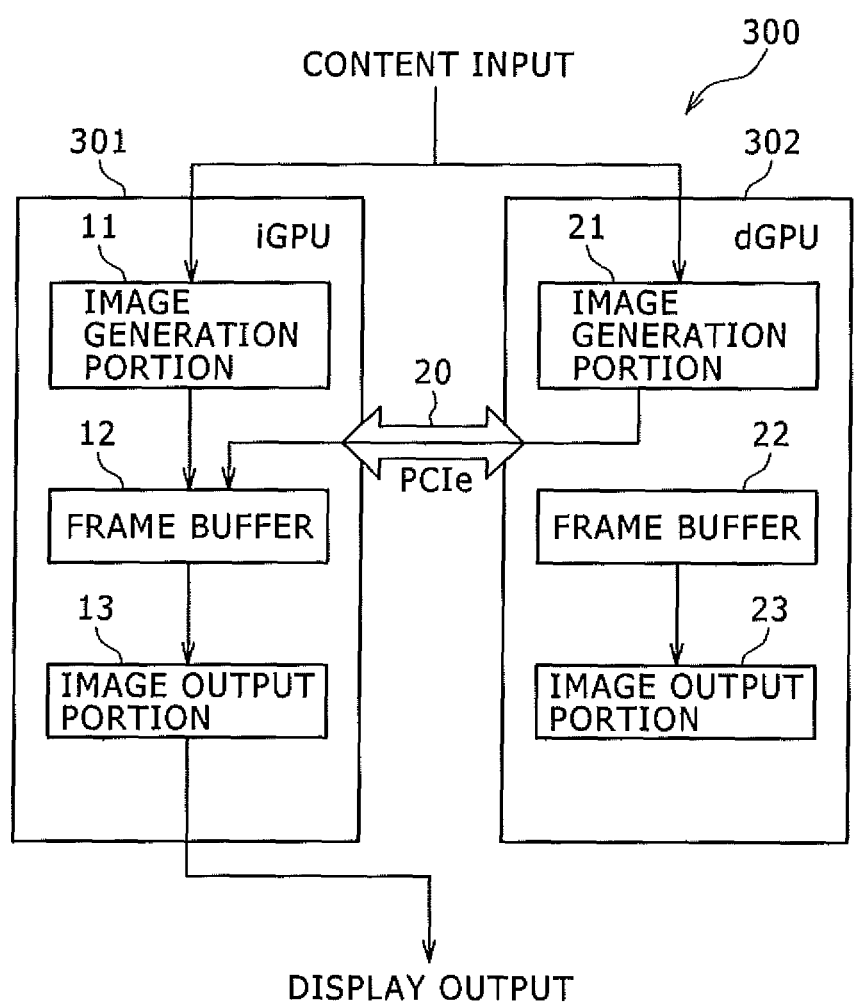
FIG. 7 is a schematic block configuration diagram of the display controller based on the MUXless system.

A specific description will be given next of the approach to displaying content based on information about supplied content with reference to FIG. 5. It should be noted that FIG. 5 is a flowchart of the approach to displaying content based on information about supplied content.

First, the CPU 4 monitors the supply of content (step S21). Next, the CPU 4 determines whether any content has been supplied (step S22).

If the supply of content is not detected in step S22, the result in this step is NO. In this case, the CPU 4 returns to step S21 to continue monitoring the supply of content.

On the other hand, when the supply of content is detected in step S22, the result in this step is YES. In this case, the CPU 4 reads the information about the copyright protection specification from the supplied content (step S23).

Next, the CPU 4 determines, based on the information about the copyright protection specification read in step S23, whether the supplied content is copyrighted (step S24).

When it is determined in step S24 that the supplied content is copyrighted, the result in this step is YES. In this case, the CPU 4 sets the content display mode to the MUXed mode (step S25).

Then, following step S25, the CPU 4 processes the supplied copyrighted content according to the MUXed mode, thus reproducing the content (step S26).

More specifically, when copyrighted content is supplied to the discrete GPU 9, this content is processed by the discrete GPU 9 and output from the same GPU 9 to the display for reproduction. It should be noted that copyrighted content protected, for example, by a standard such as CSS (Content Scrambling System), CPRM (Content Protection for Recordable Media) or AACS (Advanced Access Content System) is processed by the discrete GPU 9. Further, when digital terrestrial television broadcasting or digital satellite broadcasting is viewed, for example, its copyrighted content is processed by the discrete GPU 9.

It should be noted that if copyrighted content is supplied to the integrated GPU 8, this content is processed by the integrated GPU 8 and output from the same GPU 8 to the display for reproduction.

On the other hand, if it is determined in step S24 that the supplied content is not copyrighted, the result in this step is NO. In this case, the CPU 4 sets the content display mode to the MUXless mode (step S27).

Then, following step S27, the CPU 4 processes the supplied content according to the MUXless mode, thus reproducing the content (step S28).

More specifically, when content is supplied to the discrete GPU 9, this content is decoded by the image generation portion 21 of the discrete GPU 9 first. Next, the data of the decoded content is output to the display via the PCIe bus 20 and integrated GPU 8 for reproduction. On the other hand, when content is supplied to the integrated GPU 8, this content is processed by the integrated GPU 8 and output from the same GPU 8 to the display for reproduction.

In the present embodiment, content is displayed by switching the content display mode based on information about the supplied content as described above. It should be noted that although the present embodiment displays content based not only on information about the external display but also on information about the supplied content, the content is displayed based on information about the supplied content if the supplied content is copyrighted.

As described above, the present embodiment uses the above two approaches to displaying content. This provides image display in such a manner as to achieve the maximum performance from both of the integrated and discrete GPUs 8 and 9 while at the same time contributing to reduced power consumption. Moreover, it is possible to prevent theft of copyrighted content.

It should be noted that the above embodiment is applicable to any information processing device (image processing device) having integrated and discrete GPUs intended for applications where it is necessary to switch the content display mode, thus providing the same advantageous effect.

Further, a case has been described in the present embodiment in which the discrete GPU 9 offers higher functionality and performance than the integrated GPU 8. However, the present disclosure is not limited thereto. The present disclosure is applicable not only to a case in which the discrete GPU 9 offers higher performance and functionality than the integrated GPU 8 but also to a case in which the integrated GPU 8 offers higher performance and/or functionality than the discrete GPU 9, thus providing the same advantageous effect.

Still further, a case has been described in the present embodiment in which the distribution of supplied content between the GPUs is achieved by using the graphics driver 7. However, the present disclosure is not limited thereto. The distribution of supplied content between the GPUs may be achieved, for example, by the user operation.

It should be understood by those skilled in the art that various modifications, combinations, sub-combinations and alternations may occur depending on design requirements and other factors insofar as they are within the scope of the appended claims or the equivalent thereof.

What is claimed is:

1. A display controller comprising:
    a first display control section including a first image generation portion adapted to decode content and first image output portion adapted to output the decoded content;
    a second display control section including a second image generation portion adapted to decode content and second image output portion adapted to output the decoded content;
    a signal line adapted to convey the content decoded by the second image generation portion to the first image output portion;
    an output selection section adapted to select one of the outputs of the first and second image output portions;
    a mode selection control section incorporating the first display control section and adapted to select one of two modes, first and second display modes, based on functional information about the first and second display control sections, the first display mode being designed to output the content supplied to the second display control section via the second image generation portion and second image output portion, the second display mode being designed to output the content supplied to the second display control section via the second image generation portion, signal line and first image output portion; and
    a connection section adapted to connect an external display device,
    in which the first display control section is an integrated graphics processing unit (GPU) and the second display control section is a discrete graphics processing unit (GPU), and
    in which the mode selection control section acquires functional information about the external display device connected to the connection section, compares the functional information about the external display against functional information about the integrated GPU and the discrete GPU, and when a comparison result therefrom indicates that the functional information about the external display is closer to that of the integrated GPU as compared to the discrete GPU selects the second display mode such that the content is output from the integrated GPU and when the comparison result indicates that the functional information about the external display is closer to that of the discrete GPU as compared to the integrated GPU selects the first display mode such that the content is output from the discrete GPU,
    in which the functional information about the external display device includes audio format information regarding each audio format which is supportable on the external display device, such that the mode selection control section compares the integrated GPU and the discrete GPU with regard to the audio format information to determine which of the integrated GPU and the discrete GPU is selected.

2. The display controller of claim 1 still further comprising:
    an input selection section adapted to select one of the first and second image generation portions and supply content to the selected image generation portion.

3. The display controller of claim 1, wherein
the second display control section offers higher performance than the first display control section.

4. The display controller of claim 1, wherein
the second display control section offers higher functionality than the first display control section.

5. A display method of a display controller, the display controller including:
a first display control section having a first image generation portion adapted to decode content and first image output portion adapted to output the decoded content;
a second display control section having a second image generation portion adapted to decode content and second image output portion adapted to output the decoded content;
a signal line adapted to convey the content decoded by the second image generation portion to the first image output portion;
an output selection section adapted to select one of the outputs of the first and second image output portions;
a connection section adapted to connect an external display device; and
a mode selection control section incorporating the first display control section and adapted to select one of two modes, first and second display modes, based on functional information about the first and second display control sections, the first display mode being designed to output the content supplied to the second display control section via the second image generation portion and second image output portion, the second display mode being designed to output the content supplied to the second display control section via the second image generation portion, signal line and first image output portion, the mode selection control section operable to perform the display method comprising:
acquiring functional information about the first and second display control sections; and
selecting one of two modes, first and second display modes, based on functional information about the first and second display control sections, the first display mode being designed to output the content supplied to the second display control section via the second image generation portion and second image output portion, the second display mode being designed to output the content supplied to the second display control section via the second image generation portion, signal line and first image output portion,
in which the first display control section is an integrated graphics processing unit (GPU) and the second display control section is a discrete graphics processing unit (GPU),
in which the mode selection control section acquires functional information about the external display device connected to the connection section, compares the functional information about the external display against functional information about the integrated GPU and the discrete GPU, and when a comparison result therefrom indicates that the functional information about the external display is closer to that of the integrated GPU as compared to the discrete GPU selects the second display mode such that the content is output from the integrated GPU and when the comparison result indicates that the functional information about the external display is closer to that of the discrete GPU as compared to the integrated GPU selects the first display mode such that the content is output from the discrete GPU,
in which the functional information about the external display device includes audio format information regarding each audio format which is supportable on the external display device, such that the mode selection control section compares the integrated GPU and the discrete GPU with regard to the audio format information to determine which of the integrated GPU and the discrete GPU is selected.

\* \* \* \* \*